United States Patent
Guo et al.

(10) Patent No.: US 11,244,291 B2
(45) Date of Patent: Feb. 8, 2022

(54) METHOD AND SYSTEM FOR ALLOCATING VIRTUAL ARTICLES

(71) Applicant: ADVANCED NEW TECHNOLOGIES CO., LTD., Grand Cayman (KY)

(72) Inventors: Chunxiao Guo, Hangzhou (CN); He Zhang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 178 days.

(21) Appl. No.: 16/158,869

(22) Filed: Oct. 12, 2018

(65) Prior Publication Data
US 2019/0043027 A1   Feb. 7, 2019

Related U.S. Application Data

(63) Continuation of application No. PCT/CN2017/078932, filed on Mar. 31, 2017.

(30) Foreign Application Priority Data

Apr. 14, 2016  (CN) .......................... 201610235617.0

(51) Int. Cl.
*G06Q 20/06* (2012.01)
*H04L 29/08* (2006.01)
(Continued)

(52) U.S. Cl.
CPC ..... *G06Q 20/0655* (2013.01); *G06Q 20/3674* (2013.01); *G06Q 30/0219* (2013.01);
(Continued)

(58) Field of Classification Search
CPC .... G06Q 30/02; G06Q 50/01; G06Q 30/0269; G06Q 30/0233; G06Q 30/0241;
(Continued)

(56) References Cited

U.S. PATENT DOCUMENTS 6,591,351 B1 * 7/2003 Urabe ................. G06F 11/2074
                                                           707/999.202
7,677,979 B2   3/2010 Van Luchene
(Continued)

FOREIGN PATENT DOCUMENTS

| CN | 103973769 A | 8/2014 |
| CN | 104618226 A | 5/2015 |

(Continued)

OTHER PUBLICATIONS

International Search Report and Written Opinion for Application No. PCT/CN2017/078932, dated May 27, 2017, 8 pages.
(Continued)

*Primary Examiner* — Neha Patel
*Assistant Examiner* — Chunling Ding

(57) ABSTRACT

A method for allocating virtual articles comprises: receiving at least two acquisition requests directed at a virtual article packet, and respectively recording receiving times of the acquisition requests, wherein the virtual article packet comprises one or more virtual article sub-packets; allocating acquisition sequence numbers respectively to the acquisition requests according to a sequential order of the receiving times of the acquisition requests; and allocating the virtual article sub-packets according to the acquisition sequence numbers for the acquisition requests corresponding to the acquisition sequence numbers, and sending virtual articles in the virtual article sub-packets to users corresponding to the acquisition requests.

9 Claims, 5 Drawing Sheets

(51) Int. Cl.
*G06Q 20/36* (2012.01)
*G06Q 30/02* (2012.01)
*G06Q 30/08* (2012.01)

(52) U.S. Cl.
CPC ......... *G06Q 30/0235* (2013.01); *G06Q 30/08* (2013.01); *H04L 67/32* (2013.01)

(58) Field of Classification Search
CPC .......... G06Q 30/0208; G06Q 30/0214; G06Q 30/0611; G06Q 10/08; G06Q 10/087; G06Q 30/0635; G06Q 20/0655; G06Q 30/0219; G06Q 30/08; G06Q 30/0235; G06Q 20/3674; G06Q 30/0619; H04L 65/80; H04L 12/1831; H04L 67/32; H04L 51/046; H04L 67/38; H04L 47/34; H04L 47/78

See application file for complete search history.

(56) References Cited

U.S. PATENT DOCUMENTS

| | | | |
|---|---|---|---|
| 8,352,442 B2 | 1/2013 | Pandya | |
| 8,626,577 B2 | 1/2014 | Redford et al. | |
| 8,635,250 B2 | 1/2014 | Mehra | |
| 8,745,134 B1 | 6/2014 | Dale et al. | |
| 10,421,015 B2* | 9/2019 | Boucher | H04L 67/38 |
| 2005/0165644 A1* | 7/2005 | Beyda | G06Q 30/0277 |
| | | | 705/14.56 |
| 2007/0111797 A1 | 5/2007 | Sasaki et al. | |
| 2007/0130313 A1* | 6/2007 | King | H04L 67/2819 |
| | | | 709/223 |
| 2010/0278345 A1 | 11/2010 | Alsina et al. | |
| 2011/0145052 A1 | 6/2011 | Lin et al. | |
| 2012/0101883 A1 | 4/2012 | Akhter et al. | |
| 2012/0209686 A1 | 8/2012 | Horowitz et al. | |
| 2012/0271697 A1 | 10/2012 | Gilman et al. | |
| 2013/0159411 A1 | 6/2013 | Bowen | |
| 2013/0185127 A1 | 7/2013 | Rödén | |
| 2013/0191523 A1 | 7/2013 | Buck et al. | |
| 2014/0081952 A1* | 3/2014 | Lee | G06F 16/1744 |
| | | | 707/722 |
| 2014/0122331 A1 | 5/2014 | Vaish et al. | |
| 2014/0310109 A1* | 10/2014 | King | G06Q 30/08 |
| | | | 705/14.73 |
| 2015/0081912 A1 | 3/2015 | Tan et al. | |
| 2015/0310471 A1* | 10/2015 | Kotorov | G06Q 30/0223 |
| | | | 705/14.19 |
| 2015/0363464 A1 | 12/2015 | Alves et al. | |
| 2016/0036564 A1* | 2/2016 | Krishnan | H04L 1/1835 |
| | | | 714/748 |
| 2016/0234302 A1* | 8/2016 | Wu | G06Q 20/386 |
| 2016/0335684 A1 | 11/2016 | You et al. | |
| 2017/0279631 A1* | 9/2017 | Britt | G05B 15/02 |
| 2017/0346927 A1 | 11/2017 | Yu et al. | |
| 2018/0032974 A1* | 2/2018 | Chen | G06Q 20/123 |

FOREIGN PATENT DOCUMENTS

| | | | | |
|---|---|---|---|---|
| CN | 104680386 A | | 6/2015 | |
| CN | 104954468 A | | 9/2015 | |
| CN | 105100162 A | | 11/2015 | |
| CN | 105302907 A | | 2/2016 | |
| CN | 105302907 A | * | 2/2016 | ............ G06F 17/30 |
| CN | 105389117 A | | 3/2016 | |
| JP | 2006-236297 A | | 9/2006 | |
| JP | 2012-088841 A | | 5/2012 | |
| KR | 10-2001-0084860 A | | 9/2001 | |
| KR | 10-2012-0105582 A | | 9/2012 | |
| KR | 20120105582 A | * | 9/2012 | ............ G06Q 30/00 |
| KR | 10-2013-0049256 A | | 5/2013 | |
| WO | 02103546 A | | 12/2002 | |

OTHER PUBLICATIONS

Office Action for Korean Application No. 10-2018-7032770 dated Mar. 6, 2020, 15 pages.
First Search Report for Chinese Application No. 201610235617.0 dated Nov. 28, 2019, 1 page.
First Office Action for Chinese Application No. 201610235617.0, dated Nov. 28, 2019, 15 pages.
Supplementary Search Report for Chinese Application No. 201610235617.0, dated Apr. 17, 2020, 1 page.
International Preliminary Report on Patentability for Application No. PCT/CN2017/078932, dated Oct. 16, 2018, 8 pages.
Office Action for Taiwanese Patent Application No. 106108020, dated Jan. 31, 2019, 12 pages.
Notice of Substantive Examination Result for Indonesian Patent Application No. PID 2018 08082 dated Aug. 22, 2019 (4 pages).
Search Report for European Application No. 17781811.9 dated Oct. 22, 2019 (9 pages).
Office Action for Japanese Application No. 2018-554007 dated Oct. 1, 2019 (9 pages).
Tian Jingkun, "Design and Implementation of the Activity Platform for Securities Companies Based on REDIS," Harbin Institute of Technology, Jun. 2015.
Supplementary Search for Chinese Application No. 201610235617.0 dated Jun. 3, 2021.

* cited by examiner

METHOD AND SYSTEM FOR ALLOCATING VIRTUAL ARTICLES

CROSS REFERENCE TO RELATED APPLICATIONS

The present application is a continuation application of the International Patent Application No. PCT/CN2017/078932, filed on Mar. 31, 2017, and titled "Method and System for Allocating Virtual Articles, and Server," which claims priority to Chinese Patent Application No. 201610235617.0, filed on Apr. 14, 2016 and entitled "Method and System for Allocating Virtual Articles, and Server." The entire contents of all of the above applications are incorporated herein by reference in their entirety.

TECHNICAL FIELD

The present application relates to the field of the Internet, and in particular, to a method and a system for allocating virtual articles and a server.

BACKGROUND

With the development of network technologies, it is increasingly popular nowadays to use red envelops as a carrier to send virtual articles. Receiving and sending red envelops via mobile terminals, such as mobile phones, have become an effective manner of people's daily communications. For example, tens of thousands of users take part in activities of sending and grabbing red envelops during Spring Festivals.

With the sending of group red envelops that is currently popular as an example, detailed creation and acquisition flows will be described below.

First, a sending user creates a group red envelop through a client and determines information like a total amount to be sent, a number of red envelops to be distributed, a manner of sending, and the like. Upon receiving a red envelop sending request from the user and after the successful payment made by the user, a red envelop system correspondingly generates a list of red envelop transactions in the same number as that of red envelops according to a particular algorithm, and sends corresponding links for grabbing red envelops to a plurality of receiving users.

Each receiving user can send an acquisition request to the red envelop system by clicking the link for grabbing red envelops at a client. The red envelop system uses a service server to receive acquisition requests sent by different receiving users, and then sends all these acquisition requests to a resource management server, causing the resource management server to randomly allocate corresponding red envelop transactions to users corresponding to the acquisition requests.

In the process of allocating red envelop transactions, it is possible that the same red envelop transaction is simultaneously allocated to a plurality of receiving users during the random allocation by the resource management server because a plurality of users may all click the links for grabbing red envelops at the same time. When the resource management server allocates the same red envelop transaction to a plurality of receiving users, the problem of competing for the concurrently allocated red envelop transaction will occur. The resource management server can randomly select one from the remaining red envelop transactions that have not been successfully acquired for other users who did not successfully obtain the red envelop to acquire. On the other hand, the remaining red envelop transactions that have not been successfully acquired may also correspond to a plurality of users who are competing for red envelops, including users who were unsuccessful in acquiring the previous red envelop and users who just clicked the links for grabbing red envelops. Several rounds of competition for the concurrently allocated red envelop transactions take place in such a manner until all red envelop transactions are acquired.

The above-described existing technologies have at least the following deficiencies: in the above process of allocate red envelop transactions, the workload of the entire red envelop system is high due to the problem of several rounds of competition for concurrently allocated red envelop transactions. As a result, the allocation of red envelop transactions has low efficiency, takes a long time, and gives poor user experience.

SUMMARY

The present disclosure provides methods and systems for allocating virtual articles, which can improve the efficiency of virtual article allocation, shorten the time for allocating virtual articles, and improve user experience. An exemplary system may comprise one or more servers.

According to one aspect, a method for allocating virtual articles comprises: receiving at least two acquisition requests directed at a virtual article packet, and respectively recording receiving times of the acquisition requests, wherein the virtual article packet comprises one or more virtual article sub-packets; allocating acquisition sequence numbers respectively to the acquisition requests according to a sequential order of the receiving times of the acquisition requests; and allocating the virtual article sub-packets according to the acquisition sequence numbers for the acquisition requests corresponding to the acquisition sequence numbers, and sending virtual articles in the virtual article sub-packets to users corresponding to the acquisition requests.

In some embodiments, the acquisition requests comprise an identifier of the virtual article packet; and before the step of allocating the virtual article sub-packets according to the acquisition sequence numbers for the acquisition requests corresponding to the acquisition sequence numbers, the method further comprises: determining the virtual article packet directed at by the acquisition request according to the identifier.

In some embodiments, before the step of recording the receiving times of the acquisition requests, the method further comprises: determining users qualified for acquisition on the basis of the acquisition requests; and recording the receiving times of the acquisition requests corresponding to the users qualified for acquisition.

In some embodiments, the acquisition request comprises first state information regarding whether a first user has acquired one of the virtual article sub-packets; and determining the user qualified for acquisition on the basis of each of the acquisition requests comprises: when the first state information of the user indicates that the first user has not acquired the one virtual article sub-packet, determining that the first user is qualified for acquisition.

In some embodiments, when the virtual article includes electronic currency, the acquisition request further comprises second state information regarding whether the first user has passed a real name verification; and determining the user qualified for acquisition on the basis of each of the acquisition requests comprises: when the second state information indicates a real-name verified user, determining that the first user is qualified for acquisition.

In some embodiments, the acquisition sequence number increments sequentially from an initial value, according to the sequential order of the receiving times and according to a number of the users qualified for acquisition; and when the virtual article sub-packets are determined to have all been acquired, the acquisition sequence number is reset to the initial value.

In some embodiments, the virtual articles each comprise any one of the following: electronic currency, traffic, and electronic coupon.

In some embodiments, the receiving at least two acquisition requests directed at the virtual article packet, and respectively recording the receiving times of the acquisition requests comprises: at one or more service servers, receiving at least two acquisition requests directed at the virtual article packet, respectively recording the receiving times of the acquisition requests, and sending the acquisition requests recorded with the receiving times to a global server; the allocating the acquisition sequence numbers respectively to the acquisition requests according to the sequential order of the receiving times of the acquisition requests comprises: at the global server, receiving the acquisition requests recorded with the receiving times, allocating the acquisition sequence numbers respectively to the acquisition requests according to the sequential order of the receiving times of the acquisition requests, and sending the acquisition requests allocated with the acquisition sequence numbers to a resource management server; and the allocating the virtual article sub-packets according to the acquisition sequence numbers for the acquisition requests corresponding to the acquisition sequence numbers, and sending the virtual articles in the virtual article sub-packets to the users corresponding to the acquisition requests comprises: at the resource management server, receiving the acquisition requests allocated with the acquisition sequence numbers, allocating the virtual article sub-packets according to the acquisition sequence numbers for the acquisition requests corresponding to the acquisition sequence numbers, and sending the virtual articles in the virtual article sub-packets to the users corresponding to the acquisition requests.

According to another aspect, a system for allocating virtual articles comprises: one or more service servers configured to receive at least two acquisition requests directed at a virtual article packet, and respectively record receiving times of the acquisition requests, wherein the virtual article packet comprises one or more virtual article sub-packets; a global server configured to allocate acquisition sequence numbers respectively to the acquisition requests according to a sequential order of the receiving times of the acquisition requests; and a resource management server configured to allocate the virtual article sub-packets according to the acquisition sequence numbers for the acquisition requests corresponding to the acquisition sequence numbers, and send virtual articles in the virtual article sub-packets to users corresponding to the acquisition requests.

In some embodiments, the acquisition requests comprise an identifier of the virtual article packet; and before the resource management server allocates the virtual article sub-packets according to the acquisition sequence numbers for the acquisition requests corresponding to the acquisition sequence numbers, the resource management server is further configured to: determine the virtual article packet directed at by the acquisition request according to the identifier.

In some embodiments, before the global server allocates the acquisition sequence numbers respectively to the acquisition requests, the global server is configured to: determine users qualified for acquisition on the basis of the acquisition requests; and allocate the acquisition sequence numbers respectively to the acquisition request corresponding to the users qualified for acquisition.

In some embodiments, before the one or more service servers record the receiving times of the acquisition requests, the one or more service servers are configured to: determine users qualified for acquisition on the basis of the acquisition requests; and record the receiving times of the acquisition requests corresponding to the users qualified for acquisition.

In some embodiments, the acquisition request comprises first state information regarding whether a first user has acquired one of the virtual article sub-packets; and to determine the user qualified for acquisition on the basis of each of the acquisition requests, the one or more service servers are configured to: when the first state information of the user indicates that the first user has not acquired the one virtual article sub-packet, determine that the first user is qualified for acquisition.

In some embodiments, when the virtual article includes electronic currency, the acquisition request further comprises second state information regarding whether the first user has passed a real name verification; and to determine the user qualified for acquisition on the basis of each of the acquisition requests, the one or more service servers are configured to: when the second state information indicates a real-name verified user, determining that the first user is qualified for acquisition.

In some embodiments, the acquisition sequence number increments sequentially from an initial value, according to the sequential order of the receiving times and according to a number of the users qualified for acquisition; and when the virtual article sub-packets are determined to have all been acquired, the acquisition sequence number is reset to the initial value.

In some embodiments, to receive the at least two acquisition requests directed at the virtual article packet, and respectively record the receiving times of the acquisition requests, the one or more service servers configured to: receive at least two acquisition requests directed at the virtual article packet, respectively record the receiving times of the acquisition requests, and send the acquisition requests recorded with the receiving times to a global server; to allocate the acquisition sequence numbers respectively to the acquisition requests according to the sequential order of the receiving times of the acquisition requests, the global server is configured to receive the acquisition requests recorded with the receiving times, allocate the acquisition sequence numbers respectively to the acquisition requests according to the sequential order of the receiving times of the acquisition requests, and send the acquisition requests allocated with the acquisition sequence numbers to a resource management server; and to allocate the virtual article sub-packets according to the acquisition sequence numbers for the acquisition requests corresponding to the acquisition sequence numbers, and send the virtual articles in the virtual article sub-packets to the users corresponding to the acquisition requests, the resource management server is configured to receive the acquisition requests allocated with the acquisition sequence numbers, allocate the virtual article sub-packets according to the acquisition sequence numbers for the acquisition requests corresponding to the acquisition sequence numbers, and send the virtual articles in the virtual article sub-packets to the users corresponding to the acquisition requests.

According to another aspect, a device (e.g., server) for allocating virtual articles comprises: a processor, and a non-transitory computer-readable memory configured to: store a virtual article packet, the virtual article packet comprising one or more virtual article sub-packets; store instructions that, when executed by the processor, cause the device to perform a method for allocating virtual articles. The method comprises: receiving at least two acquisition requests directed at the virtual article packet; allocating an acquisition sequence number to each of the acquisition requests according to a sequential order of receiving times of the acquisition requests; and obtaining a corresponding virtual article sub-packet from the one or more virtual article sub-packets according to the acquisition sequence number from the memory, allocating the virtual article sub-packet for one of the acquisition requests corresponding to the acquisition sequence number, and sending a virtual article in the virtual article sub-packet to a user corresponding to the one acquisition request.

In some embodiments, the acquisition requests each comprise an identifier of the virtual article packet; and the method further comprises: determining, according to the identifier, the virtual article packet directed at by the acquisition requests.

In some embodiments, the method further comprises: respectively determining users qualified for acquisition on the basis of the acquisition requests; and respectively recording the receiving times of the acquisition requests corresponding to the users qualified for acquisition.

In some embodiments, the acquisition sequence number increments sequentially from an initial value, according to the sequential order of the receiving times and according to a number of the users qualified for acquisition; and when the virtual article sub-packets are determined to have all been acquired, the acquisition sequence number is reset to the initial value.

Thus, according to various embodiments, the service server sends all the acquisition requests recorded with receiving times to the global server, then the global server allocates corresponding acquisition sequence numbers according to the sequential order of receiving times of the acquisition requests, and the resource management server allocates a virtual article sub-packet according to the acquisition sequence number and sends virtual articles in the virtual article sub-packet to a user corresponding to the acquisition request, thereby achieving that one virtual article sub-packet uniquely corresponds to one user in a virtual article allocating process. As a result, the problem of competing for concurrently allocated virtual articles can be avoided, thereby ensuring that a system for allocating virtual articles can efficiently and pertinently allocate each to-be-allocated virtual article to a corresponding user, greatly reducing the workload of the server, improving the virtual article allocating efficiency, shortening the allocation time, and improving user experience.

In the embodiments of the present disclosure, moreover, the global server determines a sequential order in which users are allocated with acquisition sequence numbers and determines whether a user can be allocated with an acquisition sequence number according to the sequential order in which virtual article acquisition requests arrive at the service server. When network conditions are the same, therefore, the embodiments of the presents disclosure can effectively ensure, relative to the existing acquisition manner, that a user who sends an acquisition request first can have a priority opportunity to obtain a corresponding virtual article.

BRIEF DESCRIPTION OF THE DRAWINGS

To more clearly describe the embodiments of the present disclosure or current technologies, the accompanying drawings to be used in the following description of the embodiments or current technologies will be briefly introduced. The accompanying drawings described below are merely some implementation manners of the present disclosure. To those skilled in the art, other figures can be obtained according to these figures without creative effort.

DETAILED DESCRIPTION

To enable those skilled in the art to better understand technical solutions of the present disclosure, the technical solutions of the present disclosure will be clearly and completely described below with reference to the accompanying drawings in the embodiments of the present disclosure. Apparently, the described implementation manners are merely some, rather than all, of the embodiments of the present disclosure. All other implementation manners obtainable by those skilled in the art without creative effort and on the basis of the embodiments of the present disclosure shall fall within the scope of the present disclosure.

In an existing process of allocating red envelop transactions, users who are unsuccessful in acquiring a red envelop in the first round of red envelop transaction acquisition and users who just clicked the links for grabbing red envelops will compete for grabbing concurrently allocated red envelop transactions in a next round. In the next round of competition for the concurrently allocated red envelop transactions, the above users who are unsuccessful in acquiring the red envelop in the first round may be unsuccessful again. When all red envelop transactions have been successfully acquired, it is possible that some of the users who clicked the links for grabbing red envelops in the first round still fail to grab a red envelop. As a result, a user may not be able to grab a red envelop even though the user clicked a link for grabbing red envelops at a relatively early time.

Figure 1:
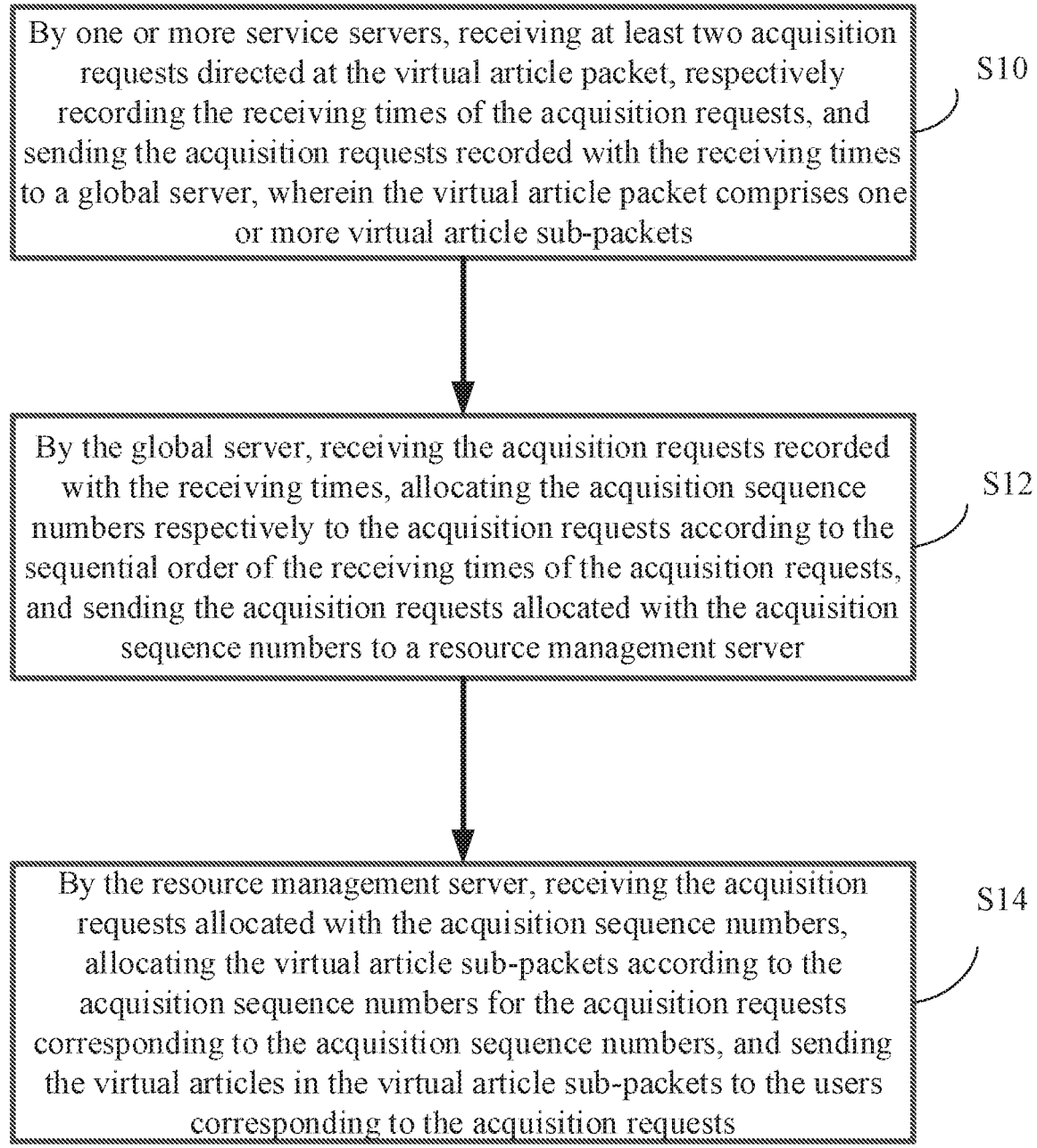
FIG. 1 is a flow chart of a method for allocating virtual articles according to various embodiments of the present disclosure.

A method and a system for allocating virtual articles and a server according to the present disclosure will be described in detail below with reference to the accompanying drawings. FIG. 1 is a flow chart of a method for allocating virtual articles according to various embodiments of the present disclosure. Although the present disclosure provides the following operating steps of methods or system structures shown in the embodiments or the accompanying drawings, more or fewer operating steps or modular structures can be included in the methods or systems based on conventional efforts or efforts without creative effort. In steps or structures having no necessary causal relationship in logic, the execution sequence of these steps or the modular structure of these systems are not limited to the execution sequence or the modular structure according to the embodiments of the present disclosure. When the methods or modular structures are executed in a practical apparatus or terminal product, they can be executed sequentially according to the connection of the methods or modular structures shown in the embodiments or the accompanying drawings, or executed in parallel (e.g., in a parallel processor or a multi-thread processing environment).

In the embodiments of the present disclosure, the system for allocating virtual articles can be a distributed system. The system for allocating virtual articles can comprise more than two service servers, global servers, resource management servers, and the like, and can also comprise other participants in the work, such as a client for sending and receiving virtual articles, which is not limited by the present disclosure. Here, the service server can be used to process a variety of specific services. For example, the service server can be used to receive and send acquisition requests, record a receiving time of an acquisition request, and the like. The resource management server can be used to manage resources. For example, the resource management server can be used to manage virtual articles in a virtual article packet. The global server can be used to control the entire distributed matter and used to allocate acquisition sequence numbers for acquisition requests under the same virtual article packet.

In some embodiments, the sending of group red envelops is used as an example. If a sending user needs to send a group red envelop, the sending user can use a client to send a message for creating a red envelop to the system for allocating virtual articles. For example, the client can execute the update/insert/delete SQL statement through JDBC (Java Data Base Connectivity), which is an application program interface in Java for standardizing how a client program accesses a database and providing methods for querying and updating data in a database. Furthermore, SQL herein means a Structured Query Language, which is a programming language used for standard data query languages in a database.

Furthermore, the system for allocating virtual articles can conduct corresponding processing on the message for creating a red envelop. For example, after the successful payment made by the user, the system generates a pre-set number of red envelop transactions for the group red envelop according to a particular algorithm, and stores the red envelop transactions corresponding to the group red envelop in the resource management server.

Referring to FIG. 1, the method for allocating virtual articles can comprise the following steps. The method may be implemented by a system for allocating virtual articles. The system may comprise one or more servers as described later with reference to FIG. 3. Although the steps below are described with respect to the various servers of the system. The various servers can be integrated into a single device, such that the method may be implemented by the system as a single device.

Step S10: by one or more service servers (e.g., service server 20 and 21 described below), receiving at least two acquisition requests directed at the virtual article packet, respectively recording the receiving times of the acquisition requests, and sending the acquisition requests recorded with the receiving times to a global server, wherein the virtual article packet comprises one or more virtual article sub-packets.

In some embodiments, after the sending user uses a client to send a message for creating a virtual article packet to the system for allocating virtual articles, the pre-set virtual article packet can be created by the system for allocating virtual articles for the message. The pre-set virtual article packet can have one or more (e.g., a pre-set number of) virtual article sub-packets. The virtual article sub-packets can correspondingly store virtual articles. The virtual articles can be a variety of articles that can be transmitted via a network. For example, the type of the virtual articles can comprise any one of the following: electronic currency (e.g., digital currency), traffic (e.g., internet traffic volume), electronic coupon, and the like. Types of the virtual articles are not limited to the examples above. The pre-set number can be set according to needs of the sending user, for example, one, or two or more, which is not limited by the present disclosure.

In some embodiments, the system for allocating virtual articles can set a predetermined identifier for the virtual article packet for uniquely identifying the virtual article packet. For example, the predetermined identifier can be a global ID. Each acquisition request can comprise the predetermined identifier of the virtual article packet, causing the server that processes the acquisition request to accurately direct to the pre-set virtual article packet. In addition, each virtual article sub-packet can correspondingly have a sub-identifier. For example, the sub-identifier of the virtual article sub-packet can be a branch ID. The number of the branch IDs is the same as the number of the virtual article sub-packets. For example, when the number of the virtual article sub-packets is 2, the predetermined identifier of the virtual article packet can be 00, and branch IDs of the virtual article sub-packets can be 01 and 02. The global ID or branch ID can be in a form of number, character string, or others, which is not limited by the present disclosure. The virtual article packet and the virtual article sub-packets can be stored in the resource management server.

In some embodiments, the system for allocating virtual articles in a distributed scenario can typically comprise two or more service servers to cope with the complex service scenario, wherein the number of the acquisition requests received by the service servers is at least two, otherwise it may be rare to encounter the problem of competing for the concurrently allocated virtual articles.

In one example where there are two service servers, it is possible that each service server receives one acquisition request in one case; in another case, it is also possible that one of the service servers receives two acquisition requests, and the other service server does not receive any acquisition request. When there are three or more service servers, moreover, it is also possible that one of the service servers receives all the acquisition requests, and the other service servers do not receive any acquisition request. In short, the number of the acquisition requests received by the service servers can be randomly allocated according to actual situations, which is not limited by the present disclosure.

In some embodiments, for each of the received acquisition requests, the service servers can respectively record a time when it arrives at the service server and then send the acquisition request recorded with the receiving time to the global server.

Step S12: by the global server, receiving the acquisition requests recorded with the receiving times, allocating the acquisition sequence numbers respectively to the acquisition requests according to the sequential order of the receiving times of the acquisition requests, and sending the acquisition requests allocated with the acquisition sequence numbers to a resource management server.

In some embodiments, the global server receives acquisition requests recorded with receiving times sent by all the service servers. The global server can allocate an acquisition sequence number to each acquisition request sequentially according to the sequential order of receiving times of the acquisition requests, wherein the acquisition sequence numbers can be used to uniquely represent an acquisition sequence of users corresponding to the acquisition requests. The acquisition sequence numbers can be in a form of number, character string, and the like, which is not limited by the present disclosure. The global server sends the acquisition requests allocated with acquisition sequence numbers to the resource management server.

In some embodiments, the global server can provide a counter for each virtual article packet. In one example, the counter can be configured to use a historical record value set for the virtual article packet as an initial value allocated to the current virtual article packet. Each time when it is determined that an acquisition request is received, the value of the acquisition sequence number increments sequentially according to a pre-set step length to form a current record value of the counter. On the basis of the current record value of the counter, the acquisition sequence number of a user qualified for acquisition can be determined. For example, the current record value of the counter=the initial value+N×the pre-set step length, wherein N increments sequentially with 1 as the initial value and according to the number of users qualified for acquisition, the value range of N is [1, M], and M is the number of virtual articles. For the first user qualified for acquisition, the corresponding acquisition sequence number can be the initial value+1×the pre-set step length; for the second user qualified for acquisition, the corresponding acquisition sequence number can be the initial value+2×the pre-set step length; so on and so forth until the $M^{th}$ user qualified for acquisition, the corresponding acquisition sequence number can be the initial value+M×the pre-set step length. Here, the acquisition sequence number can be a ratio of a difference between the current record value and the initial value to the pre-set step length. For example, when the initial value is 0 and the pre-set step length is 1, the sequence number increments from 1 and sequentially according to an incremental sequence of natural numbers.

In the embodiments, when the number of the sequence numbers is equal to the number of the virtual article sub-packets, it indicates that the allocation of the virtual articles has completed. At this moment, the global server does not allocate corresponding sequence numbers to acquisition requests anymore, and the initial value of the sequence number can be reset to the initial value, such as reset to zero.

In one embodiment, the acquisition requests can comprise a predetermined identifier of the virtual article packet during the entire process of allocating virtual articles. When the global server needs to allocate sequence numbers simultaneously to a plurality of acquisition requests from different virtual article packets, it can simultaneously sort a plurality of acquisition requests for the same virtual article packet by recognizing the predetermined identifier of the virtual article packet.

Step S14: by the resource management server, receiving the acquisition requests allocated with the acquisition sequence numbers, allocating the virtual article sub-packets according to the acquisition sequence numbers for the acquisition requests corresponding to the acquisition sequence numbers, and sending the virtual articles in the virtual article sub-packets to the users corresponding to the acquisition requests.

In some embodiments, the virtual article packet is stored in the resource management server. The resource management server receives the acquisition requests allocated with the acquisition sequence numbers by the global server, then can determine a virtual article sub-packet under the virtual article packet corresponding to the acquisition sequence number according to the acquisition sequence number, and send virtual articles in the virtual article sub-packet to a user corresponding to the acquisition request.

For example, the virtual article sub-packet can be stored in the resource management server in a pre-determined storage manner. The pre-determined storage manner can be storage in a data stack structure, and the pre-determined storage manner can also be another manner, which is not limited by the present disclosure. The resource management server can sequentially retrieve virtual article sub-packets according to the natural sequence of the acquisition sequence numbers, and allocate virtual articles in the virtual article sub-packets to the sending user corresponding to the acquisition request. For example, the acquisition sequence number corresponding user A is 1, and a first virtual article sub-packet can be retrieved from the data stack; the acquisition sequence number corresponding user B is 2, and a second virtual article sub-packet can be retrieved from the data stack, so on and so forth until all virtual article sub-packets in the virtual article packet are allocated.

In one embodiment, the system for allocating virtual articles can set a predetermined identifier for the virtual article packet and can also set a sub-identifier for each virtual article sub-packet. Correspondingly, each acquisition request can comprise the predetermined identifier of the virtual article packet. The resource management server can first find a corresponding virtual article packet according to the predetermined identifier of the virtual article packet. When the to-be-acquired virtual article packet is determined, corresponding virtual article sub-packets can be acquired according to the acquisition sequence numbers.

In some embodiments, there can be a predetermined correspondence between the sub-identifiers of the virtual article sub-packets and the acquisition sequence numbers. During an exemplary allocation, a sub-identifier of the virtual article sub-packet can be determined according to the acquisition sequence number allocated to the user and the predetermined correspondence, and then a corresponding virtual article can be determined. Subsequently, the determined virtual article is sent to the user corresponding to the acquisition sequence number. The predetermined correspondence can be a relationship capable of corresponding the acquisition sequence numbers to the sub-packets one by one.

For example, in an exemplary embodiment, the virtual article packet has 2 virtual article sub-packets, the predetermined identifier of the virtual article packet can be 00, and the sub-identifiers of the virtual article sub-packets can be 01 and 02, respectively. The acquisition sequence numbers allocated to the acquisition requests can be 1 and 2, respectively. Then, the predetermined correspondence can be a relationship of sequential correspondence. For example, the sub-identifier corresponding to the acquisition request having an acquisition sequence number of 1 can be 01, and the sub-identifier corresponding to the acquisition request having an acquisition sequence number of 2 can be 02. In addition, the predetermined correspondence can be a relationship of correspondence in a reverse sequence. For example, the sub-identifier corresponding to the acquisition request having an acquisition sequence number of 1 can be 02, and the sub-identifier corresponding to the acquisition request having an acquisition sequence number of 2 can be 01.

The predetermined correspondence is not limited to the above description. Those skilled in the art may further make other modifications, which shall all fall within the scope of the present disclosure as long as the functions and effects achieved thereby are the same as or similar to the present disclosure.

In the embodiments of the present disclosure, the service servers send all the acquisition requests recorded with receiving times to the global server, the global server allocates a corresponding acquisition sequence number according to the sequential order of receiving times of the acquisition requests, and the resource management server allocates a corresponding virtual article sub-packet according to the acquisition sequence number and sends virtual articles in the virtual article sub-packet to a user corresponding to the acquisition request, thereby achieving that one virtual article sub-packet uniquely corresponds to one user in a virtual article allocating process. As a result, the problem of competing for concurrently allocated virtual articles can be avoided, thereby ensuring that a system for allocating virtual articles can efficiently and pertinently allocate each to-be-allocated virtual article to a corresponding user, greatly reducing the workload of the server, improving the virtual article allocating efficiency, shortening the allocation time, and improving user experience.

In the embodiments of the present disclosure, moreover, the global server determines a sequential order in which users are allocated with acquisition sequence numbers and determines whether a user can be allocated with an acquisition sequence number according to the sequential order in which virtual article acquisition requests arrive at the service server. When network conditions are the same, therefore, the embodiments of the presents disclosure can effectively ensure, relative to the existing acquisition manner, that a user who sends an acquisition request first can have a priority opportunity to obtain a corresponding virtual article.

In one embodiment, the acquisition requests can comprise a predetermined identifier of the virtual article packet; and correspondingly, before the resource management server allocates a virtual article sub-packet according to the acquisition sequence number for an acquisition request corresponding to the acquisition sequence number, the method can further comprise: determining, by the resource management server, the pre-set virtual article packet directed at by the acquisition request according to the acquisition sequence number.

In some embodiments, a plurality of virtual article packets can be stored in the resource management server. When the acquisition request comprises the predetermined identifier of the virtual article packet, the resource management server can determine the pre-set virtual article packet directed at by the acquisition request via the predetermined identifier. When the virtual article packet is determined, the resource management server can allocate virtual article sub-packets under the virtual article packet according to the acquisition sequence number for the acquisition request corresponding to the acquisition sequence number, thereby enabling the server to allocate virtual article sub-packets under different virtual article packets simultaneously.

In one embodiment, before the service server records a receiving time of each acquisition request, the method can further comprise: determining, by the service server, a user qualified for acquisition on the basis of the acquisition request; and correspondingly, recording, by the service server, a receiving time of the acquisition request corresponding to the user qualified for acquisition.

In some embodiments, the acquisition request can comprise information for determining whether the user sending the acquisition request is qualified for acquisition. On the basis of the information, whether the user sending the virtual article acquisition request is qualified for acquisition can be determined.

For example, the acquisition request can comprise first state information regarding whether a user (e.g., a first user) has acquired the virtual article sub-packet. When the first state information of the user indicates as not acquired, it indicates that the user corresponding to the acquisition request is qualified for acquisition. That is, determining the user qualified for acquisition on the basis of each of the acquisition requests comprises: when the first state information of the user indicates that the first user has not acquired the virtual article sub-packet, determining that the first user is qualified for acquisition. On the contrary, when the first state information of the user indicates as acquired, it indicates that the user corresponding to the acquisition request has acquired the corresponding virtual article and is not qualified for virtual article acquisition. Here, the first state information can be in a form of identifier 0 or 1. When the user corresponding to the acquisition request has not acquired the virtual article, the user's corresponding first state information can be 0; when the user has acquired the virtual article, the user's corresponding first state information can be 1. The particular form of the first state information is not limited to the above example and is not limited by the present disclosure.

In one embodiment, before the global server allocates an acquisition sequence number to each acquisition request, the method can further comprise: determining, by the global server, a user qualified for acquisition on the basis of the acquisition request; and correspondingly, allocating, by the global server, an acquisition sequence number to an acquisition request corresponding to the user qualified for acquisition.

In some embodiments, the acquisition request can comprise information for determining whether the user sending the acquisition request is qualified for acquisition. On the basis of the information, whether the user sending the virtual article acquisition request is qualified for acquisition can be determined.

For example, the acquisition request can comprise first state information regarding whether a user has acquired the virtual article sub-packet. When the first state information of the user indicates as not acquired, it indicates that the user corresponding to the acquisition request is qualified for acquisition. On the contrary, when the first state information of the user indicates as acquired, it indicates that the user corresponding to the acquisition request has acquired the corresponding virtual article and is not qualified for virtual article acquisition. Here, the first state information can be in a form of identifier 0 or 1. When the user corresponding to the acquisition request has not acquired the virtual article, the user's corresponding first state information can be 0; when the user has acquired the virtual article, the user's corresponding first state information can be 1. The particular form of the first state information is not limited to the above example and is not limited by the present disclosure.

In an exemplary embodiment, when the type of the virtual article is electronic currency, the acquisition request can further comprise second state information regarding whether a user (e.g., a first user) has passed real name verification, and when the second state information is a real-name verified user, it indicates that the user corresponding to the acquisition request is qualified for acquisition. That is, determining the user qualified for acquisition on the basis of each of the acquisition requests comprises: when the second state information indicates a real-name verified user, determining that the first user is qualified for acquisition. On the contrary, when the second state information is not a real-name verified user, it indicates that the user corresponding to the acquisition request is not qualified for acquisition.

In some embodiments, when the first state information comprised in the acquisition request indicates as not acquired, and when the second state information represents a real-name verified user, it indicates that the user corresponding to the acquisition request is qualified for acquisition. In one example, the second state information can also be in a form of identifier 0 or 1. When the user corresponding to the acquisition request is a real-name verified user, the user's corresponding second state information can be 0; when the user corresponding to the acquisition request is not a real-name verified user, the user's corresponding second state information can be 1. The particular form of the second state information is not limited to the above example and is not limited by the present disclosure. In some embodiments, in the scenario that the virtual article includes electronic currency, illegal activities, such as money laundering by issuing an electronic currency, can be prevented by limiting a user to be qualified for acquisition only after passing real name verification.

In one embodiment, the method can further comprise: updating the first state information of the user.

After the user is allocated with a corresponding virtual article, the first state information of the user can be updated from the original state of having not acquired to the state of having acquired. If the user who has acquired the virtual article clicks the link for grabbing red envelops again after the first state information of the user is updated, the service server or the global server in the system for allocating virtual articles can determine that it is no longer qualified for virtual article acquisition since the user's first state information is in the state of having acquired, thereby avoiding the situation that one user repeatedly acquires a plurality of virtual articles under one virtual article packet.

In one embodiment, the acquisition sequence number can be set as follows: incrementing sequentially from a pre-set initial value, according to a sequential order of receiving times and according to a number of the users qualified for acquisition; and when it is determined that the virtual article sub-packets have all been acquired, the acquisition sequence number is reset to the initial value.

In some embodiments, each acquisition request sent by the service server to the global server can comprise a receiving time when each acquisition request arrives at the service server. The global server can recognize users qualified for acquisition according to a sequential order of receiving times comprised in the acquisition requests, and each time when a user qualified for acquisition is determined, the counter can sequentially perform corresponding counting of the user.

For example, the global server can provide a unified counter for virtual article packets. After the service server or the global server determines that a user corresponding to an acquisition request is qualified for acquisition, the counter can allocate a corresponding acquisition sequence number to the user qualified for acquisition. For example, the acquisition sequence number can be a count value of the counter that increments sequentially according to the number of users qualified for acquisition. When the number of users qualified for acquisition is equal to the total number of virtual articles, it indicates that all virtual article sub-packets have been acquired. At this moment, the count value of the counter can be reset to the initial value. Here, the initial value of the counter can be 0, an ID of the virtual article packet corresponding to the virtual article sub-packet, or any character string, which is not limited by the present disclosure.

In an exemplary embodiment, the virtual article packet has, for example, 2 virtual article sub-packets, and the virtual article sub-packets each have corresponding sub-identifiers, which are ID+1 and ID+2, respectively. The pre-set step length is 1, and the initial value is the pre-set identifier of the virtual article packet that is ID. When a first user qualified for acquisition is determined, the record value of the counter changes to ID+1, and when a second user qualified for acquisition is determined, the record value of the counter changes to ID+2. In the above case, the record value of the counter is the same as the identifiers of the virtual article sub-packets, and the identifiers of the virtual article sub-packets can be determined according to the record value. Corresponding virtual articles can be queried according to the determined identifiers of the virtual article sub-packets, and then the virtual articles can be allocated to corresponding users.

In an exemplary scenario, when virtual article acquisition requests sent by two users arrive at the service server at the same time and both users are qualified for acquisition, the counter performs counting of them in a random order. When the number of remaining unallocated virtual article sub-packets is 2 or more, the acquisition sequence numbers corresponding to the above users are next to each other and different by 1. For example, the acquisition sequence numbers are 2 and 3, respectively. When the number of remaining unallocated virtual article sub-packets is only one, the corresponding user who is counted by the counter first can be allocated with the corresponding acquisition sequence number, while the other user cannot be allocated with an acquisition sequence number.

Figure 2:
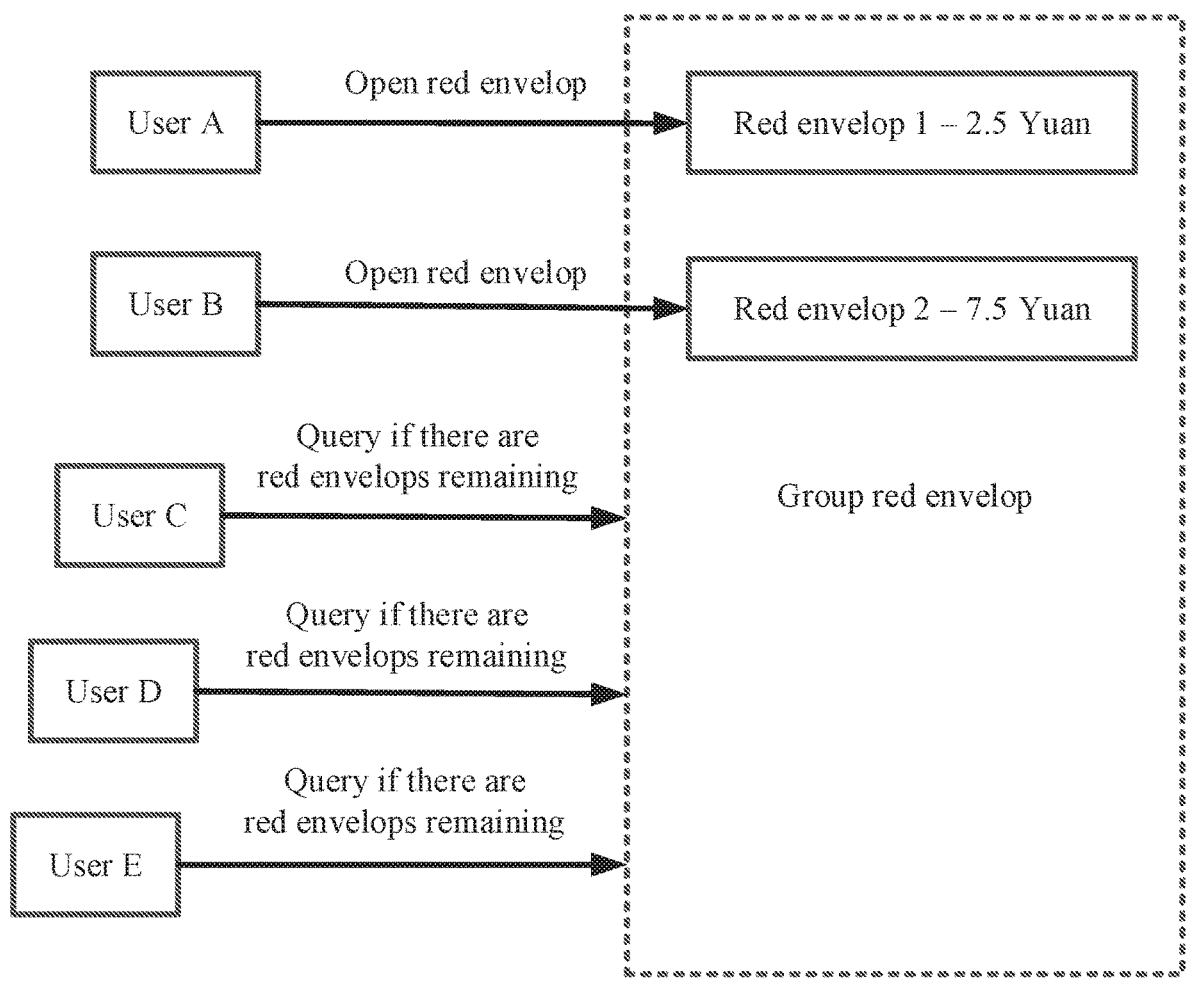
FIG. 2 is a schematic diagram of allocation of the method for allocating virtual articles according to various embodiments of the present disclosure.

In an application scenario of grabbing group red envelops, for example, a sending user needs to send a group red envelop in the amount of 10 Yuan. According to the need of the sending user, the group red envelop in the amount of 10 Yuan is divided, by random amounts, into two red envelops for sending. As shown in FIG. 2, the group red envelop can be divided into red envelop 1 and red envelop 2, the amount in the red envelop 1 is 2.5 Yuan, and the amount in the red envelop 2 is 7.5 Yuan. There is a total of 5 users competing for these two red envelopes, wherein user A, user B, user C, user D, and user E click to open the red envelops, respectively. Correspondingly, they send acquisition requests to the service server, respectively. The time at which the service server receives the acquisition requests from user A, user B, user C, user D, and user E is recorded as 8:30:31:05 on Feb. 7, 2016, 8:30:31:10 on Feb. 7, 2016, 8:30:31:45 on Feb. 7, 2016, 8:30:32:20 on Feb. 7, 2016, and 8:30:35:30 on Feb. 7, 2016, respectively. Then, the service server sends the acquisition requests comprising the receiving times to the global server. The global server can allocate acquisition sequence numbers to users corresponding to the acquisition requests according to the sequential order of the acquisition requests. In one example, during allocation, the global server can allocate an acquisition sequence number of the $N^{th}$ virtual article sub-packet to the $N^{th}$ user qualified for acquisition, wherein N increments sequentially with 1 as the initial value and according to the number of users qualified for acquisition, the value range of N is [1, M], and M is the number of virtual article sub-packets. For example, an acquisition sequence number of 1 is allocated to the first user A, and an acquisition sequence number of 2 is allocated to the second user B. Since there are only two red envelops, the global server can determine the number of acquisition sequence numbers that can be allocated according to the number of red envelops, and stop the allocation of acquisition sequence numbers once the number of acquisition sequence numbers reaches the number of red envelops. The resource management server takes an amount of 2.5 from the red envelop 1 and sends it to the user A according to the acquisition sequence number 1; the resource management server takes an amount of 7.5 from the red envelop 2 and sends it to the user B according to the acquisition sequence number 2. Correspondingly, the resource management server no longer allocates a red envelop to the user C, user D, and user E.

On the basis of the method for allocating virtual articles described in the embodiments, the present disclosure further provides a system for allocating virtual articles.

Figure 3:
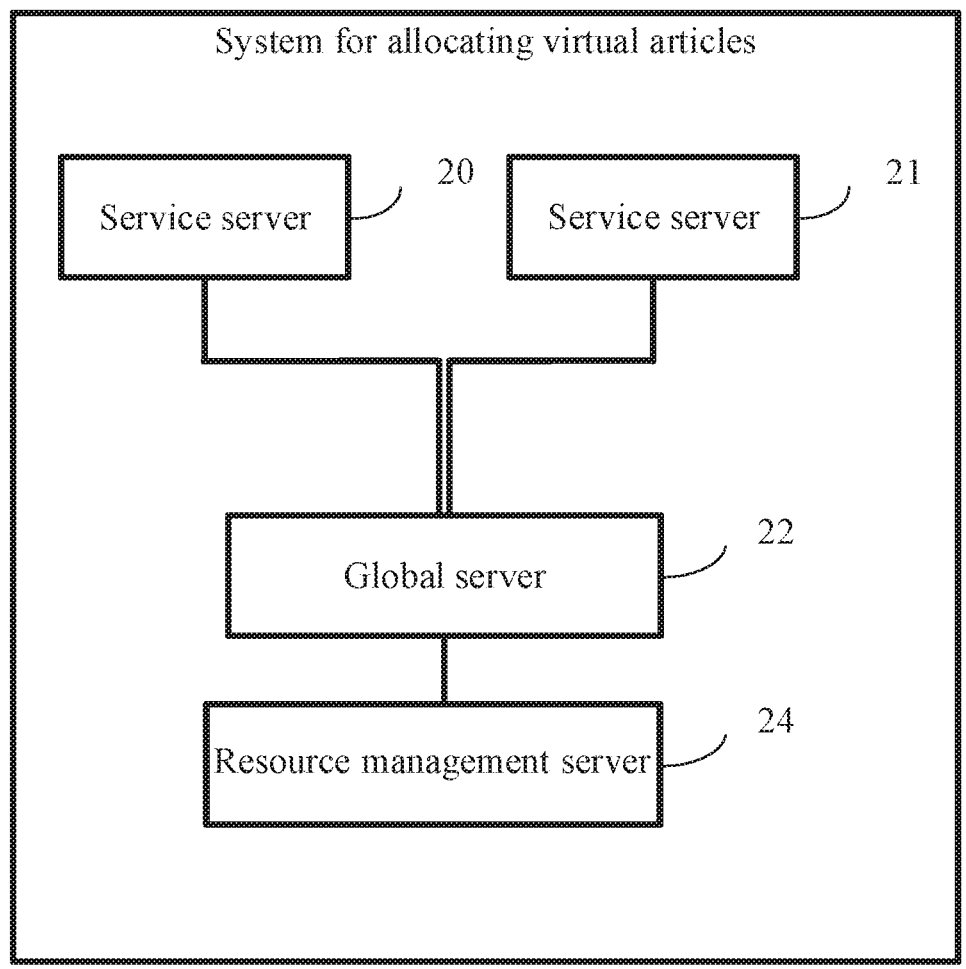
FIG. 3 is a schematic diagram of a system for allocating virtual articles according to various embodiments of the present disclosure.

Referring to FIG. 3, the system for allocating virtual articles can comprise: a global server 22, a resource management server 24, and service servers, wherein there can be at least two service servers, e.g., the service server 20 and the service server 21, respectively, the service servers are configured to receive at least two acquisition requests directed at a pre-set virtual article packet, respectively record a receiving time of each acquisition request, and send the acquisition requests recorded with the receiving time to the global server, wherein the pre-set virtual article packet has a pre-set number of virtual article sub-packets;

the global server 22 is configured to receive the acquisition requests recorded with the receiving time sent by the service servers, allocate an acquisition sequence number to each acquisition request according to the sequential order of receiving times of the acquisition requests, and send the acquisition requests allocated with acquisition sequence numbers to the resource management server; and the resource management server 24 is configured to receive the acquisition requests allocated with the acquisition sequence numbers sent by the global server, allocate a virtual article sub-packet according to the acquisition sequence number for an acquisition request corresponding to the acquisition sequence number, and send virtual articles in the virtual article sub-packet to a user corresponding to the acquisition request.

In one embodiment with respect to the system for allocating virtual articles, the acquisition requests can comprise a predetermined identifier of the virtual article packet; and correspondingly, the resource management server 24 can be further configured to determine, according to the predetermined identifier, pre-set virtual article packets directed at by the acquisition requests.

In one embodiment with respect to the system for allocating virtual articles, the service servers can be further configured to: determine a user qualified for acquisition on the basis of the acquisition request; and correspondingly, the service servers record a receiving time of the acquisition request corresponding to the user qualified for acquisition.

In one embodiment with respect to the system for allocating virtual articles, the global server 22 can be further configured to: determine a user qualified for acquisition on the basis of the acquisition request; and correspondingly, the global server 22 allocates an acquisition sequence number to an acquisition request corresponding to the user qualified for acquisition.

In one embodiment with respect to the system for allocating virtual articles, the acquisition request can comprise first state information regarding whether a user has acquired the virtual article sub-packet. When the first state information of the user indicates as not acquired, it indicates that the user corresponding to the acquisition request is qualified for acquisition.

In one embodiment with respect to the system for allocating virtual articles, the acquisition sequence number can be set as follows: incrementing sequentially from a pre-set initial value, according to a sequential order of receiving times and according to a number of the users qualified for acquisition; and when it is determined that the virtual article sub-packets have all been acquired, the acquisition sequence number is reset to the initial value.

The system for allocating virtual articles disclosed by the above implementation manners corresponds to the embodiments of the method for allocating virtual articles of the present disclosure, which can implement the method for allocating virtual articles of the present disclosure and achieve the technical effect of the method implementation manners.

The method for allocating virtual articles of the present disclosure can also be applicable to a non-distributed scenario.

In some embodiments, two or more of the service servers 20 and 21, the global server 22, and the resource management server 24 may integrate into a single device (e.g., server) for allocating virtual articles. Alternatively, the service servers 20 and 21, the global server 22, and the resource management server 24 may exist as separated and connected devices. Either way, the integrated device or the separate devices may each be implemented as software instructions (or hardware components, or a combination of software and hardware). That is, the service servers 20 and 21, the global server 22, and the resource management server 24, individually or integrated as a single device, may comprise a processor and a non-transitory computer-readable storage medium storing instructions that, when executed by the processor, cause one or more components (e.g., the processor) of the device to perform various steps and methods described above.

Figure 4:
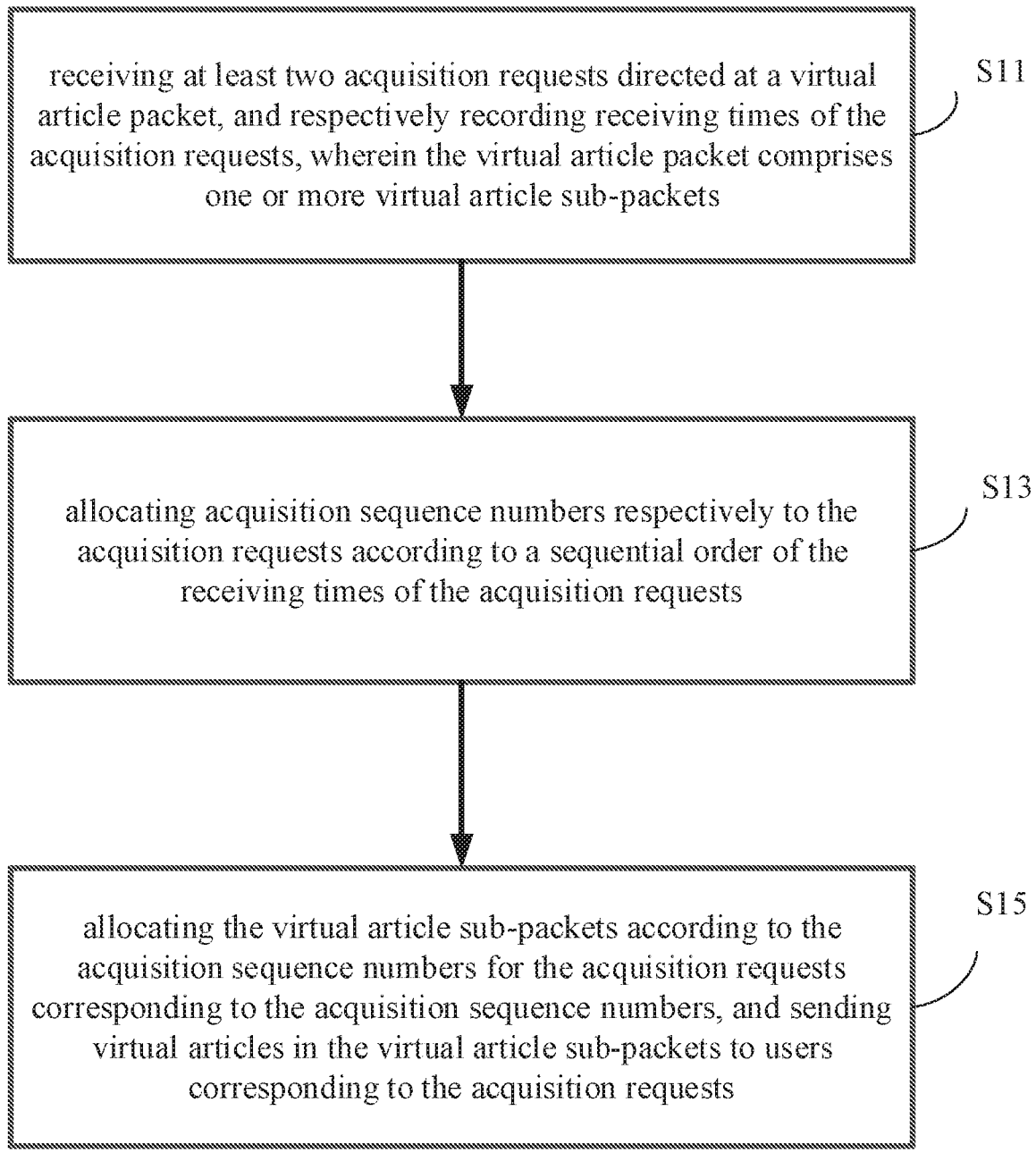
FIG. 4 is a flow chart of a method for allocating virtual articles according to various embodiments of the present disclosure.

Referring to FIG. 4, another method for allocating virtual articles according to an implementation manner of the present disclosure can comprise the following steps.

Step S11: receiving at least two acquisition requests directed at a virtual article packet, and respectively recording receiving times of the acquisition requests, wherein the virtual article packet comprises one or more virtual article sub-packets.

In some embodiments, after the sending user uses a client to send a message for creating a virtual article packet to a server, the pre-set virtual article packet can be created by the server for the message. The pre-set virtual article packet can have a pre-set number of virtual article sub-packets. The virtual article sub-packets can correspondingly store virtual articles. The virtual articles can be a variety of articles that can be transmitted via a network. For example, the type of the virtual articles can comprise any one of the following: electronic currency, traffic, electronic coupons, and the like. Types of the virtual articles are not limited to the examples above. The pre-set number can be set according to needs of the sending user, for example, one, or two or more, which is not limited by the present disclosure.

In some embodiments, the server can set a predetermined identifier for the virtual article packet for uniquely identifying the virtual article packet. For example, the predetermined identifier can be a global ID. Each acquisition request can comprise the predetermined identifier of the virtual article packet, causing the server to accurately direct to the pre-set virtual article packet when processing the acquisition request. In addition, each virtual article sub-packet can correspondingly have a sub-identifier. For example, the sub-identifier of the virtual article sub-packet can be a branch ID. The number of the branch IDs is the same as the number of the virtual article sub-packets. For example, when the number of the virtual article sub-packets is 2, the predetermined identifier of the virtual article packet can be 00, and branch IDs of the virtual article sub-packets can be 01 and 02. The global ID or branch ID can be in a form of number, character string, or others, which is not limited by the present disclosure. The virtual article packet and the virtual article sub-packets can be stored in the server.

In some embodiments, for each of the received acquisition requests, the server can respectively record a time when it arrives at the server, so as to record the sequential order of the acquisition requests arriving at the server.

Step S13: allocating acquisition sequence numbers respectively to the acquisition requests according to a sequential order of the receiving times of the acquisition requests.

In some embodiments, the server can allocate, for acquisition requests recorded with receiving times, corresponding acquisition sequence numbers to the acquisition requests sequentially according to the sequential order of receiving times of the acquisition requests, wherein the acquisition sequence numbers can be used to uniquely represent an acquisition sequence of users corresponding to the acquisition requests. The acquisition sequence numbers can be in a form of number, character string, and the like, which is not limited by the present disclosure.

In some embodiments, the server can provide a counter for each virtual article packet. In one example, the counter can be configured to use a historical record value set for the virtual article packet as an initial value allocated to the current virtual article packet. Each time when it is determined that an acquisition request is received, the value of the acquisition sequence number increments sequentially according to a pre-set step length to form a current record value of the counter. On the basis of the current record value of the counter, the acquisition sequence number of a user qualified for acquisition can be determined. For example, the current record value of the counter=the initial value+N×the pre-set step length, wherein N increments sequentially with 1 as the initial value and according to the number of users qualified for acquisition, the value range of N is [1, M], and M is the number of virtual articles. For the first user qualified for acquisition, the corresponding acquisition sequence number can be the initial value+1×the pre-set step length; for the second user qualified for acquisition, the corresponding acquisition sequence number can be the initial value+2×the pre-set step length; so on and so forth until the $M^{th}$ user qualified for acquisition, the corresponding acquisition sequence number can be the initial value+M×the pre-set step length. Here, the acquisition sequence number can be a ratio of a difference between the current record value and the initial value to the pre-set step length. For example, when the initial value is 0 and the pre-set step length is 1, the sequence number increments from 1 and sequentially according to an incremental sequence of natural numbers.

In the embodiment, when the number of the sequence numbers is equal to the number of the virtual article sub-packets, it indicates that the allocation of the virtual articles has completed. At this moment, the server does not allocate corresponding sequence numbers to acquisition requests anymore, and the initial value of the sequence number can be reset to the initial value, such as reset to zero.

In one embodiment, the acquisition requests can comprise a predetermined identifier of the virtual article packet during the entire process of allocating virtual articles. When the server needs to allocate sequence numbers simultaneously to a plurality of acquisition requests from different virtual article packets, it can simultaneously sort a plurality of acquisition requests for the same virtual article packet by recognizing the predetermined identifier of the virtual article packet.

Step S15: allocating the virtual article sub-packets according to the acquisition sequence numbers for the acquisition requests corresponding to the acquisition sequence numbers, and sending virtual articles in the virtual article sub-packets to users corresponding to the acquisition requests.

In some embodiments, the virtual article packet is stored in the server. The server can determine a virtual article sub-packet under the virtual article packet corresponding to the acquisition sequence number according to the acquisition sequence number, and then send virtual articles in the virtual article sub-packet to a user corresponding to the acquisition request.

For example, the virtual article sub-packet can be stored in the server in a pre-determined storage manner. The pre-determined storage manner can be storage in a data stack structure, and the pre-determined storage manner can also be another manner, which is not limited by the present disclosure. The server can sequentially retrieve virtual article sub-packets according to the natural sequence of the acquisition sequence numbers, and allocate virtual articles in the virtual article sub-packets to the sending user corresponding to the acquisition request. For example, the acquisition sequence number corresponding user A is 1, and a first virtual article sub-packet can be retrieved from the data stack; the acquisition sequence number corresponding user B is 2, and a second virtual article sub-packet can be retrieved from the data stack, so on and so forth until all virtual article sub-packets in the virtual article packet are allocated.

In one embodiment, the server can set a predetermined identifier for the virtual article packet and can also set a sub-identifier for each virtual article sub-packet. Correspondingly, each acquisition request can comprise the predetermined identifier of the virtual article packet. The server can first find a corresponding virtual article packet according to the predetermined identifier of the virtual article packet. When the to-be-acquired virtual article packet is determined, corresponding virtual article sub-packets can be acquired according to the acquisition sequence numbers.

In some embodiments, there can be a predetermined correspondence between the sub-identifiers of the virtual article sub-packets and the acquisition sequence numbers. During an exemplary allocation, a sub-identifier of the virtual article sub-packet can be determined according to the acquisition sequence number allocated to the user and the predetermined correspondence, and then a corresponding virtual article can be determined. Subsequently, the determined virtual article is sent to the user corresponding to the acquisition sequence number. The predetermined correspondence can be a relationship capable of corresponding the acquisition sequence numbers to the sub-packets one by one.

For example, in an exemplary embodiment, the virtual article packet has 2 virtual article sub-packets, the predetermined identifier of the virtual article packet can be 00, and the sub-identifiers of the virtual article sub-packets can be 01 and 02, respectively. The acquisition sequence numbers allocated to the acquisition requests can be 1 and 2, respectively. Then, the predetermined correspondence can be a relationship of sequential correspondence. For example, the sub-identifier corresponding to the acquisition request having an acquisition sequence number of 1 can be 01, and the sub-identifier corresponding to the acquisition request having an acquisition sequence number of 2 can be 02. In addition, the predetermined correspondence can be a relationship of correspondence in a reverse sequence. For example, the sub-identifier corresponding to the acquisition request having an acquisition sequence number of 1 can be 02, and the sub-identifier corresponding to the acquisition request having an acquisition sequence number of 2 can be 01.

The predetermined correspondence is not limited to the above description. Those skilled in the art may further make other modifications, which shall all fall within the scope of the present disclosure as long as the functions and effects achieved thereby are the same as or similar to the present disclosure.

In the embodiments of the present disclosure, a corresponding acquisition sequence number is allocated by recording receiving times of the acquisition requests and according to the sequential order of receiving times of the acquisition requests, and a corresponding virtual article sub-packet is allocated according to the acquisition sequence number; virtual articles in the virtual article sub-packet are sent to a user corresponding to the acquisition request, thereby achieving that one virtual article sub-packet uniquely corresponds to one user in a virtual article allocating process. As a result, the problem of competing for concurrently allocated virtual articles can be avoided, thereby ensuring that a server can efficiently and pertinently allocate each to-be-allocated virtual article to a corresponding user, greatly reducing the workload of the server, improving the virtual article allocating efficiency, shortening the allocation time, and improving user experience.

In the embodiments of the present disclosure, moreover, the server determines a sequential order in which users are allocated with acquisition sequence numbers and determines whether a user can be allocated with an acquisition sequence number according to the sequential order in which acquisition requests arrive at the server. When network conditions are the same, the embodiments of the present disclosure can effectively ensure, relative to the existing acquisition manner, that a user who sends an acquisition request first can have a priority opportunity to obtain a corresponding virtual article.

In one embodiment, the acquisition requests can comprise a predetermined identifier of the virtual article packet; and correspondingly, before the step of allocating a virtual article sub-packet according to the acquisition sequence number for an acquisition request corresponding to the acquisition sequence number, the method can further comprise: determining the pre-set virtual article packet directed at by the acquisition request according to the predetermined identifier.

In some embodiments, a plurality of virtual article packets can be stored in the server. When the acquisition request comprises the predetermined identifier of the virtual article packet, the server can determine the pre-set virtual article packet directed at by the acquisition request via the predetermined identifier. When the virtual article packet is determined, the server can allocate virtual article sub-packets according to the acquisition sequence number for the acquisition request corresponding to the acquisition sequence number.

In one embodiment, before the step of recording a receiving time of each acquisition request, the method can further comprise: determining a user qualified for acquisition on the basis of the acquisition request; and correspondingly, recording a receiving time of the acquisition request corresponding to the user qualified for acquisition.

In some embodiments, the acquisition request can comprise information for determining whether the user sending the acquisition request is qualified for acquisition. On the basis of the information, whether the user sending the virtual article acquisition request is qualified for acquisition can be determined.

For example, the acquisition request can comprise first state information regarding whether a user has acquired the virtual article sub-packet. When the first state information of the user indicates as not acquired, it indicates that the user corresponding to the acquisition request is qualified for acquisition. On the contrary, when the first state information of the user indicates as acquired, it indicates that the user corresponding to the acquisition request has acquired the corresponding virtual article and is not qualified for acquisition. Here, the first state information can be in a form of identifier 0 or 1. When the user corresponding to the acquisition request has not acquired the virtual article, the user's corresponding first state information can be 0; when the user has acquired the virtual article, the user's corresponding first state information can be 1. The particular form of the first state information is not limited to the above example and is not limited by the present disclosure.

In one embodiment, the acquisition sequence number can be set as follows: incrementing sequentially from a pre-set initial value, according to a sequential order of receiving times and according to a number of the users qualified for acquisition; and when it is determined that the virtual article sub-packets have all been acquired, the acquisition sequence number is reset to the initial value.

In some embodiments, each acquisition request can comprise a receiving time when each acquisition request arrives at the server. The server can recognize users qualified for acquisition according to a sequential order of receiving times comprised in the acquisition requests, and each time when a user qualified for acquisition is determined, the counter can sequentially perform corresponding counting of the user.

For example, the server can provide a unified counter for virtual article packets. After the server determines that a user corresponding to an acquisition request is qualified for acquisition, the counter can allocate a corresponding acquisition sequence number to the user qualified for acquisition. For example, the acquisition sequence number can be a count value of the counter that increments sequentially according to the number of users qualified for acquisition. When the number of users qualified for acquisition is equal to the total number of virtual articles, it indicates that all virtual articles have been acquired. At this moment, the count value of the counter can be reset to the initial value. Here, the initial value of the counter can be 0, an ID of the virtual article packet corresponding to the virtual article sub-packet, or any character string, which is not limited by the present disclosure.

In an exemplary embodiment, the virtual article packet has, for example, 2 virtual articles, and the virtual article sub-packets each have corresponding sub-identifiers, which are ID+1 and ID+2, respectively. The pre-set step length is 1, and the initial value is the pre-set identifier of the virtual article packet that is ID. When a first user qualified for acquisition is determined, the record value of the counter changes to ID+1, and when a second user qualified for acquisition is determined, the record value of the counter changes to ID+2. In the above case, the record value of the counter is the same as the identifiers of the virtual article sub-packets, and the identifiers of the virtual article sub-packets can be determined according to the record value. Corresponding virtual articles can be queried according to the determined identifiers of the virtual article sub-packets, and then the virtual articles can be allocated to corresponding users.

In an exemplary scenario, when virtual article acquisition requests sent by two users arrive at the service server at the same time and both users are qualified for acquisition, the counter performs counting of them in a random order. When the number of remaining unallocated virtual article sub-packets is 2 or more, the acquisition sequence numbers corresponding to the above users are next to each other and different by 1. For example, the acquisition sequence numbers are 2 and 3, respectively. When the number of remaining unallocated virtual article sub-packets is only one, the corresponding user who is counted by the counter first can be allocated with the corresponding acquisition sequence number, while the other user cannot be allocated with an acquisition sequence number.

In an application scenario of grabbing group red envelops, for example, a sending user needs to send a group red envelop in the amount of 10 Yuan. According to the need of the sending user, the group red envelop in the amount of 10 Yuan is divided, in a manner that the amounts are random, into two red envelops for sending. As shown in FIG. 2, the group red envelop can be divided into red envelop 1 and red envelop 2, the amount in the red envelop 1 is 2.5 Yuan, and the amount in the red envelop 2 is 7.5 Yuan. There is a total of 5 users competing for these two red envelopes, wherein user A, user B, user C, user D, and user E click to open the red envelopes, respectively. Correspondingly, they send acquisition requests to the server, respectively. The time at which the server receives the acquisition requests from user A, user B, user C, user D, and user E is recorded as 8:30:31:05 on Feb. 7, 2016, 8:30:31:10 on Feb. 7, 2016, 8:30:31:45 on Feb. 7, 2016, 8:30:32:20 on Feb. 7, 2016, and 8:30:35:30 on Feb. 7, 2016, respectively. The server can allocate acquisition sequence numbers to users corresponding to the acquisition requests according to the sequential order of the acquisition requests arriving at the server. In one example, during allocation, the server can allocate an acquisition sequence number of the $N^{th}$ virtual article sub-packet to the $N^{th}$ user qualified for acquisition, wherein N increments sequentially with 1 as the initial value and according to the number of users qualified for acquisition, the value range of N is [1, M], and M is the number of virtual article sub-packets. For example, an acquisition sequence number of 1 is allocated to the first user A, and an acquisition sequence number of 2 is allocated to the second user B. Since there are only two red envelopes, the server can determine the number of acquisition sequence numbers that can be allocated according to the number of red envelopes, and stop the allocation of acquisition sequence numbers once the number of acquisition sequence numbers reaches the number of red envelopes. The server takes an amount of 2.5 from the red envelop 1 and sends it to the user A according to the acquisition sequence number 1; the server takes an amount of 7.5 from the red envelop 2 and sends it to the user B according to the acquisition sequence number 2. Correspondingly, the server no longer allocates a red envelop to the user C, user D, and user E.

In one embodiment, the acquisition requests can comprise a predetermined identifier of the virtual article packet; and correspondingly, before the step of allocating a virtual article sub-packet according to the acquisition sequence number for an acquisition request corresponding to the acquisition sequence number, the method can further comprise: determining the pre-set virtual article packet directed at by the acquisition request according to the predetermined identifier.

In some embodiments, a plurality of virtual article packets can be stored in the server. When the acquisition request comprises the predetermined identifier of the virtual article packet, the server can determine the pre-set virtual article packet directed at by the acquisition request via the predetermined identifier. When the virtual article packet is determined, the server can allocate virtual article sub-packets under the virtual article packet according to the acquisition sequence number for the acquisition request corresponding to the acquisition sequence number, thereby enabling the server to allocate virtual article sub-packets under different virtual article packets simultaneously.

In one embodiment, before the step of recording a receiving time of each acquisition request, the method can further comprise: determining a user qualified for acquisition on the basis of the acquisition request; and correspondingly, recording a receiving time of the acquisition request corresponding to the user qualified for acquisition.

In some embodiments, the acquisition request can comprise information for determining whether the user sending the acquisition request is qualified for acquisition. On the basis of the information, whether the user sending the virtual article acquisition request is qualified for acquisition can be determined.

For example, the acquisition request can comprise first state information regarding whether a user has acquired the virtual article sub-packet. When the first state information of the user indicates as not acquired, it indicates that the user corresponding to the acquisition request is qualified for acquisition. On the contrary, when the first state information of the user indicates as acquired, it indicates that the user corresponding to the acquisition request has acquired the corresponding virtual article and is not qualified for acquisition. Here, the first state information can be in a form of identifier 0 or 1. When the user corresponding to the acquisition request has not acquired the virtual article, the user's corresponding first state information can be 0; when the user has acquired the virtual article, the user's corresponding first state information can be 1. The particular form of the first state information is not limited to the above example and is not limited by the present disclosure.

In one embodiment, the acquisition sequence number can be set as follows: incrementing sequentially from a pre-set initial value, according to a sequential order of receiving times and according to a number of the users qualified for acquisition; and when it is determined that the virtual article sub-packets have all been acquired, the acquisition sequence number is reset to the initial value.

In some embodiments, each acquisition request can comprise a receiving time when each acquisition request arrives at the server. The server can recognize users qualified for acquisition according to a sequential order of receiving times comprised in the acquisition requests, and each time when a user qualified for acquisition is determined, the counter can sequentially perform corresponding counting of the user.

For example, the server can provide a unified counter for virtual article packets. After the server determines that a user corresponding to an acquisition request is qualified for acquisition, the counter can allocate a corresponding acquisition sequence number to the user qualified for acquisition. For example, the acquisition sequence number can be a count value of the counter that increments sequentially according to the number of users qualified for acquisition. When the number of users qualified for acquisition is equal to the total number of virtual articles, it indicates that all virtual articles have been acquired. At this moment, the count value of the counter can be reset to the initial value. Here, the initial value of the counter can be 0, an ID of the virtual article packet corresponding to the virtual article sub-packet, or any character string, which is not limited by the present disclosure.

On the basis of the method for allocating virtual articles described in the embodiments above, the present disclosure further provides a server.

Figure 5:
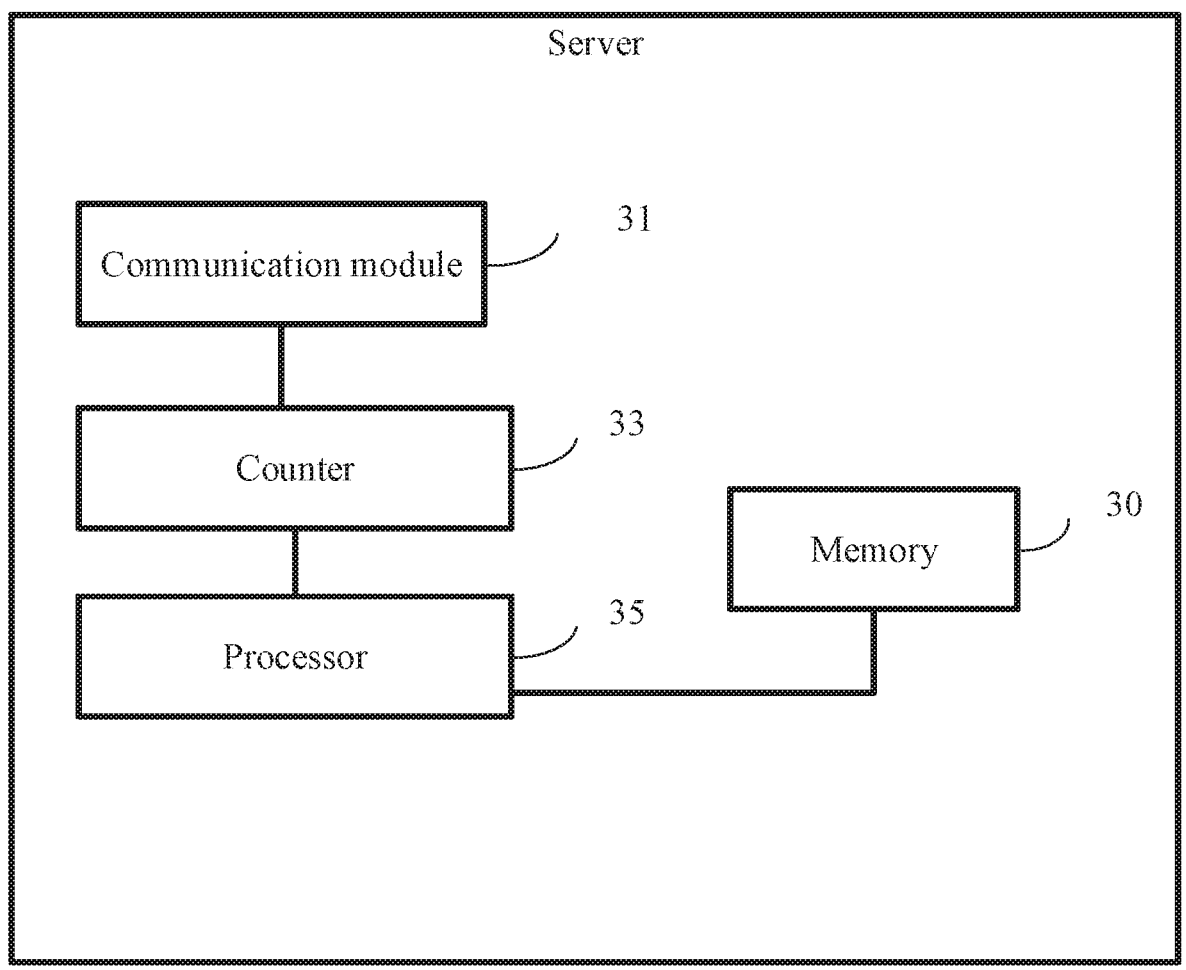
FIG. 5 is a schematic diagram of a server according to various embodiments of the present disclosure.

Referring to FIG. 5, the server (referred to as a device for allocating virtual articles) can comprise a memory 30 (e.g., a non-transitory computer-readable storage medium storing instructions), a communication module 31, a counter 33, and a processor 35, wherein: the memory 30 can be configured to store a pre-set virtual article packet, the pre-set virtual article packet comprising a pre-set number of virtual article sub-packets; the communication module 31 can be configured to receive at least two acquisition requests directed at the pre-set virtual article packet; the counter 33 can be configured to allocate an acquisition sequence number to each acquisition request according to the sequential order of receiving times of the acquisition requests; and the processor 35 can be configured to obtain a corresponding virtual article sub-packet according to the acquisition sequence number from the memory 30, allocate the virtual article sub-packet for an acquisition request corresponding to the acquisition sequence number, and send virtual articles in the virtual article sub-packet to a user corresponding to the acquisition request via the communication module 31. Alternatively, the communication model 31 and the counter 33 may be integrated into the processor 35 or the memory 30, with the corresponding steps being performed by the processor 35. Either way, the memory may store instructions that, when executed by the processor 35, cause one or more components of the server to perform various steps and methods described herein.

In one embodiment with respect to the server, the acquisition requests can comprise a predetermined identifier of the virtual article packet; and correspondingly, the processor 35 can be further configured to determine, according to the predetermined identifier, pre-set virtual article packets directed at by the acquisition requests.

In one embodiment with respect to the system for allocating virtual articles, the processor 35 can be further configured to determine a user qualified for acquisition on the basis of the acquisition request; and record a receiving time of the acquisition request corresponding to the user qualified for acquisition.

In one embodiment with respect to the server, the acquisition sequence number can be:

incrementing sequentially from a pre-set initial value, according to a sequential order of receiving times and according to a number of the users qualified for acquisition; and when it is determined that the virtual article sub-packets have all been acquired, the acquisition sequence number is reset to the initial value.

The server disclosed by the above implementation manners corresponds to the implementation manners (or referred to as embodiments) of the method for allocating virtual articles of the present disclosure, which can implement the method for allocating virtual articles of the present disclosure and achieve the technical effect of the method implementation manners.

The above description of the embodiments of the present disclosure are merely applications in some embodiments of the present disclosure, and implementation manners that are slightly modified on the basis of some standards and methods can also implement the embodiments of the present disclosure. Other variations without involving an inventive step that are consistent with steps of the processing methods in the above implementation manners of the present disclosure can still achieve the same application, which will not be repeated herein.

Although the present disclosure provides operating steps of the methods shown in the embodiments or the flow charts, more or fewer operating steps can be included in the methods based on conventional effort or effort without creative effort. The sequence of these steps listed in the embodiments is merely one of numerous step execution sequences and does not represent the only execution sequence. When executed in a practical apparatus or client product, the methods can be executed sequentially according to the sequence of the methods shown in the embodiments or the accompanying drawings, or executed in parallel (e.g., in a parallel processor or a multi-thread processing environment).

The systems, apparatuses or modules set forth in the above implementation manners can be, for example, implemented by a computer chip or entity, or by a product having certain function. For convenience of description, the above apparatus is divided into various units according to functions for separate description. When the embodiments of the present disclosure is implemented, functions of the modules can be achieved in one or multiple pieces of software and/or hardware. A module for certain function can also be implemented by a combination of a plurality of sub-modules or sub-units.

The method, system, or module according to the embodiments of the present disclosure can be implemented by embedding a readable program into a controller. The controller can be implemented according to particular requirements. For example, the controller may be in, for example, a form of a microprocessor or processor, as well as a computer readable medium that stores computer readable program codes (e.g. software or firmware) executable by the (micro)processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC 18F26K20 and Silicone Labs C8051F320. A memory controller may further be implemented as a part of a control logic of a memory. Those skilled in the art should also be aware that, in addition to that a controller is implemented in a manner of pure computer readable program codes, it is totally feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may even be deemed as both software modules to implement a method and a structure inside a hardware part.

Some modules in the system according to the present disclosure can be described in the general context of a computer executable instruction executed by a computer, such as a program module. Typically, a program module comprises routines, programs, objects, components, data structures, classes, and the like for executing particular tasks or implementing particular abstract data types. The embodiments of the present disclosure can also be implemented in distributed computing environments. In the distributed computing environments, remote processing devices connected via a communication network are used to execute tasks. In distributed computing environments, program modules can be located in local and remote computer storage media, including storage devices.

According to the description of the above implementation manners, those skilled in the art can learn that the present disclosure can be implemented by software plus necessary hardware. On the basis of such an understanding, the technical solution of the present disclosure can be, or the part of the technical solution contributing to the current technologies can be embodied in a form of a software product or through an implementation process of data migration. The computer software product can be stored in a storage medium, such as a ROM/RAM, a magnetic disc, an optical disc, and the like, including several instructions that enable a computer device (which can be a personal computer, a mobile terminal, a server, or a network device) to execute the methods according to the embodiments of the present disclosure or some parts of the embodiments.

The embodiments in this description are described in a progressive manner with each implementation manner focused on differences from other implementation manners, and the embodiments may be mutually referenced for identical or similar parts thereof. All or a part of the present disclosure can be applied in numerous general or dedicated computer system environments or configurations, such as a personal computer, a server computer, a handheld device or portable device, a tablet device, a mobile communication terminal, a multi-processor system, a microprocessor-based system, a programmable electronic device, a network PC, a micro-computer, a mainframe computer, a distributed computing environment comprising any of the above systems or devices, and the like.

Embodiments of the present disclosure are described in the present disclosure documents. Those skilled in the art can understand that the embodiments of the present disclosure can be combined with each other. Moreover, those skilled in the art are aware that the present disclosure has many variations and changes without departing from the spirit of the present disclosure. The appended claims encompass these variations and changes without departing from the spirit of the present disclosure.

What is claimed is:

1. A method, comprising:
  receiving, using one or more processors of a distributed system, from a first client of a first user, a first amount of an electronic currency and a request to create a virtual article packet corresponding to the first amount of the electronic currency;
  in response to receiving the request:
    creating, using the one or more processors, the virtual article packet;
    generating, using the one or more processors, a pre-set number of virtual article sub-packets from the virtual article packet, each of the virtual article sub-packets corresponding to a respective second amount of the electronic currency, wherein the sum of the respective second amounts is equal to the first amount; and
    setting, using the one or more processors, an identifier for the virtual article packet and a sub-identifier for each of the virtual article sub-packets generated from the virtual article packet;
  receiving, using the one or more processors, from multiple second clients of multiple respective second users, multiple respective acquisition requests directed at the virtual article packet, the acquisition requests each comprising the identifier of the virtual article packet, and the number of acquisition requests exceeding the pre-set number of virtual article sub-packets;
  respectively recording, using the one or more processors, receiving times of the acquisition requests;
  allocating, using the one or more processors, an acquisition sequence number to each of a subset of the acquisition requests according to a sequential order of the receiving times of the acquisition requests, wherein allocating acquisition sequence numbers stops once the number of allocated acquisition sequence numbers reaches the pre-set number of virtual article sub-packets;
  storing, using the one or more processors, the virtual article packet and the virtual article sub-packets;
  determining, using the one or more processors, based on the identifier of the virtual article packet included in each of the subset of acquisition requests and the stored virtual article packet, the virtual article packet directed at by the subset of acquisition requests;
  allocating, using the one or more processors, based on the stored virtual article sub-packets that correspond to the determined virtual article packet and a sequential correspondence between the sub-identifiers of the virtual article sub-packets and the acquisition sequence numbers, each of the virtual article sub-packets to a respective one of the acquisition requests that was allocated an acquisition sequence number; and
  for each of the virtual article sub-packets that are allocated, sending, using the one or more processors, the respective second amount of the electronic currency corresponding to the virtual article sub-packet to the second client of the second user that sent the acquisition request allocated the virtual article sub-packet.

2. The method according to claim 1, wherein, before recording the receiving times of the acquisition requests, the method further comprises:
  determining, using the one or more processors, the second users qualified for acquisition on the basis of the acquisition requests; and
  recording, using the one or more processors, the receiving times of the acquisition requests corresponding to the second users qualified for acquisition.

3. The method according to claim 2, wherein: a first acquisition request of the acquisition requests comprises first state information regarding whether one of the second users has acquired a virtual article sub-packet; and
  determining the second users qualified for acquisition on the basis of each of the acquisition requests comprises: when the first state information of the one second user indicates that the one second user has not acquired a one of the virtual article sub-packets, determining that the one second user is qualified for acquisition.

4. The method according to claim 2, wherein:
  the acquisition sequence number increments sequentially from an initial value, according to the sequential order of the receiving times and according to a number of the second users qualified for acquisition; and when the virtual article sub-packets are determined to have all been acquired, the acquisition sequence number is reset to the initial value.

5. A distributed system, comprising:
one or more processors; and
one or more non-transitory computer-readable mediums storing instructions executable by the one or more processors to perform operations comprising:
 receiving, from a first client of a first user, a first amount of an electronic currency and a request to create a virtual article packet corresponding to the first amount of the electronic currency;
 in response to receiving the request:
  creating the virtual article packet,
   generating a pre-set number of virtual article sub-packets from the virtual article packet, each of the virtual article sub-packets corresponding to a respective second amount of the electronic currency, wherein the sum of the respective second amounts is equal to the first amount, and
   setting an identifier for the virtual article packet and a sub-identifier for each of the virtual article sub-packets generated from the virtual article packet;
 receiving, from multiple second clients of multiple respective second users, multiple respective acquisition requests directed at the virtual article packet, the acquisition requests each comprising the identifier of the virtual article packet, and the number of acquisition requests exceeding the pre-set number of virtual article sub-packets,
 respectively recording receiving times of the acquisition requests, and
 allocating an acquisition sequence number to each of a subset of the acquisition requests according to a sequential order of the receiving times of the acquisition requests, wherein allocating acquisition sequence numbers stops once the number of allocated acquisition sequence numbers reaches the pre-set number of virtual article sub-packets, and
 storing the virtual article packet and the virtual article sub-packets;
 determining, based on the identifier of the virtual article packet included in each of the subset of acquisition requests and the stored virtual article packet, the virtual article packet directed at by the subset of acquisition requests;
 allocating, based on the stored virtual article sub-packets that correspond to the determined virtual article packet and a sequential correspondence between the sub-identifiers of the virtual article sub-packets and the acquisition sequence numbers, each of the virtual article sub-packets to a respective one of the acquisition requests that was allocated an acquisition sequence number, and
 for each of the virtual article sub-packets that are allocated, sending the respective second amount of the electronic currency corresponding to the virtual article sub-packet to the second client of the second user that sent the acquisition request allocated the virtual article sub-packet.

6. The system according to claim 5, wherein the operations further comprise:
 before allocating the acquisition sequence numbers, determining the second users qualified for acquisition on the basis of the acquisition requests.

7. The system according to claim 5, wherein:
 the operations further comprise: before recording the receiving times of the acquisition requests, determining the second users qualified for acquisition on the basis of the acquisition requests; and
 recording the receiving times of the acquisition requests, comprises: recording the receiving times of the acquisition requests corresponding to the second users qualified for acquisition.

8. The system according to claim 7, wherein: a first acquisition request of the acquisition requests comprises first state information regarding whether one of the second users has acquired a virtual article sub-packet; and
 to determine the seconds users qualified for acquisition on the basis of each of the acquisition requests, the operations further comprise: when the first state information of the one second user indicates that the one second user has not acquired one of the virtual article sub-packets, determining that the one second user is qualified for acquisition.

9. The system according to claim 6, wherein:
 the acquisition sequence number increments sequentially from an initial value, according to the sequential order of the receiving times and according to a number of the second users qualified for acquisition; and
 when the virtual article sub-packets are determined to have all been acquired, the acquisition sequence number is reset to the initial value.

* * * * *